United States Patent [19]
Yoshida

[11] Patent Number: 5,327,991
[45] Date of Patent: Jul. 12, 1994

[54] EXHAUST GAS PURIFYING APPARATUS AND METHOD FOR A HYBRID CAR

[75] Inventor: Masato Yoshida, Kyoto, Japan

[73] Assignee: Mitsubishi Jidosha Kogyo Kabushiki Kaisha, Tokyo, Japan

[21] Appl. No.: 939,469

[22] Filed: Sep. 2, 1992

[30] Foreign Application Priority Data

Sep. 3, 1991 [JP] Japan ............................. 3-070359[U]

[51] Int. Cl.⁵ ............................................. B60K 13/04
[52] U.S. Cl. ..................................... 180/65.4; 60/300
[58] Field of Search ............... 180/65.1, 65.2, 65.3, 180/65.4, 309, 65.8; 60/294, 300, 302, 303

[56] References Cited
FOREIGN PATENT DOCUMENTS 2101903 4/1990 Japan .
331510 2/1991 Japan .
3155306 7/1991 Japan .

Primary Examiner—Richard M. Camby

[57] ABSTRACT

An exhaust gas purifying apparatus for a hybrid car, which is of the heater catalyst type and which is provided with an electric motor 1 for driving the hybrid car, a battery 2 for supplying electric power to the electric motor 1, a power generator 3 for charging the battery 2, an internal-combustion engine 4 for driving the power generator 3, and a controller 5 for controlling the operation of the internal-combustion engine 4. The internal-combustion engine 4 is equipped with a catalyst 9 installed in an exhaust pipe 8 for purifying exhaust gas, and a heater 9 for heating the catalyst 9 under the control of the controller 5 to enhance its catalytic action. The controller 5 actuates the internal-combustion engine 4 after the catalyst 9 is heated by the heater 9.

12 Claims, 5 Drawing Sheets

EXHAUST GAS PURIFYING APPARATUS AND METHOD FOR A HYBRID CAR

BACKGROUND OF THE INVENTION

The present invention relates to an exhaust gas purifying apparatus and method for a hybrid car, which are suited for an electric vehicle or the like equipped with an electric motor for driving the vehicle and an internal-combustion engine for generating electric power.

In recent years, the emission regulation on internal-combustion engines is becoming stringent primarily because of the environmental problems, and many new technologies are being researched and developed to comply with the regulation. One of such efforts is represented by the "electric vehicle."

The electric vehicle is driven by an electric motor, and the electric motor basically receives electric power from a battery. The battery, however, has a limited capacity, making it difficult to achieve a long-distance drive. For this reason, the "hybrid car," which is equipped with a power generator for charging the battery and an internal-combustion engine for driving the power generator in addition to the above-mentioned electric motor and battery, is currently regarded as a typical form of the electric vehicle.

However, the hybrid car is, after all, provided with an internal-combustion engine; therefore, how to achieve the exhaust gas purification of the internal-combustion engine is extremely important to fulfill the original object of the electric vehicle to provide a pollution-free automobile. Accordingly, the internal-combustion engine mounted on the hybrid car is adapted for steady driving at, for example, a constant rotational speed, as a rule, to thereby minimize the generation of harmful substances such as CO and NOx by avoiding unsteady driving. Also, an exhaust pipe is provided with a catalyst for purifying exhaust gas as in a general internal-combustion engine, or stoichiometric feedback by an $O_2$ sensor, lean feedback by an air-fuel ratio sensor, or the like is conducted to purify exhaust gas.

Meanwhile, as a device for powerfully controlling the exhaust gas of an internal-combustion engine, there has been proposed the "heater catalyst," the catalytic action thereof has been dramatically improved by heating the catalyst provided in an exhaust pipe by a heater to activate it.

Nevertheless, although various corrective measures have been taken for purifying the exhaust gas of the conventional hybrid cars as described above, there is still a problem that these measures alone cannot fully reduce the generation of harmful substances in exhaust gas to a level which is required of the electric vehicle.

Meanwhile, the heater catalyst, which is commonly recommended for the conventional internal-combustion engines, cannot provide powerful catalytic action until the catalyst is fully heated and activated; therefore, emission of harmful substances during that period is more or less unavoidable. Thus, to obtain powerful catalytic action from the start of an engine, the catalyst must be preheated before the engine is started so that the activation of the catalyst will have been finished when the engine is started. This is an extremely complicated operation for a driver, adversely affecting the practicality.

OBJECT AND SUMMARY OF THE INVENTION

An object of the present invention is to provide an exhaust gas purifying apparatus and method for a hybrid car which are designed for effective purification of exhaust gas of a power generating internal-combustion engine, while enjoying the advantages of the heater catalyst.

According to one aspect of the present invention, the exhaust gas purifying apparatus for a hybrid car is equipped with an electric motor for driving the hybrid car, a battery for supplying electric power to the electric motor, a power generator for charging the battery, an internal-combustion engine for driving the power generator, a catalyst provided in tile exhaust pipe of the internal-combustion engine for purifying exhaust gas, a heating means for heating the catalyst to enhance the catalytic action, and a control means for controlling the operations of the heating means and the internal-combustion engine. Preferably, the control means is operable to actuate the engine after the catalyst is heated by the heating means to an activating temperature at which the catalyst is sufficiently activated.

According to another aspect of the present invention, the exhaust gas purifying method for a hybrid car, which is equipped with the aforementioned electric motor, battery, power generator, and internal-combustion engine, comprises a heating step, wherein a catalyst provided in an exhaust pipe of the internal-combustion engine for purifying exhaust gas is heated to enhance the catalytic action, and an engine actuating step, wherein the internal-combustion engine is actuated after the catalyst is heated, in the heating step, to an activating temperature.

As explained above, the exhaust gas purifying apparatus for a hybrid car according to the present invention is equipped with an electric motor for driving the vehicle, a battery for supplying electric power to the electric motor, a power generator for charging the battery, an internal-combustion engine for driving the power generator, a catalyst provided in an exhaust pipe of the internal-combustion engine for purifying exhaust gas, a heating means for heating the catalyst to enhance the catalytic action, and a control means for controlling the operations of the heating means and the internal-combustion engine; preferably, the control means actuates the engine after the catalyst is heated to its activating temperature by the heating means; therefore, tile catalyst will have been sufficiently activated and its catalytic action will have been enhanced so that satisfactory purification of exhaust gas may be accomplished by the time the internal-combustion engine is actuated. Thus, according to the present invention, harmful substances in exhaust gas can be powerfully purified in all of the operation states of a hybrid car.

In addition, the electric motor receives electric power supplied from the battery to drive the vehicle until the heating of the catalyst by the heating means is completed. This enables the driver to immediately start and move the vehicle without waiting until the heating means completes heating the catalyst.

Further, the exhaust gas purifying method for a hybrid car comprises a heating step, wherein a catalyst, which is provided in the exhaust pipe of the internal-combustion engine to purify exhaust gas, is heated to enhance the catalytic action, and an engine actuating step wherein the internal-combustion engine is actuated after the catalyst is heated to its activating temperature in the heating step, thus providing excellent exhaust gas purifying performance as with the above-mentioned apparatus according to the present invention.

Thus, according to the exhaust gas purifying apparatus and method for a hybrid car of the present invention, the operation of the heating means for activating the catalyst, which powerfully purifies harmful substances in exhaust gas, and the operation of the power generating internal-combustion engine of the "electric vehicle" are properly controlled, thereby achieving dramatically improved purification of the exhaust gas of the power generating internal-combustion engine of a hybrid car.

DETAILED DESCRIPTION

With reference to the accompanying drawings, an embodiment of the present invention will now be described in detail.

Figure 1:
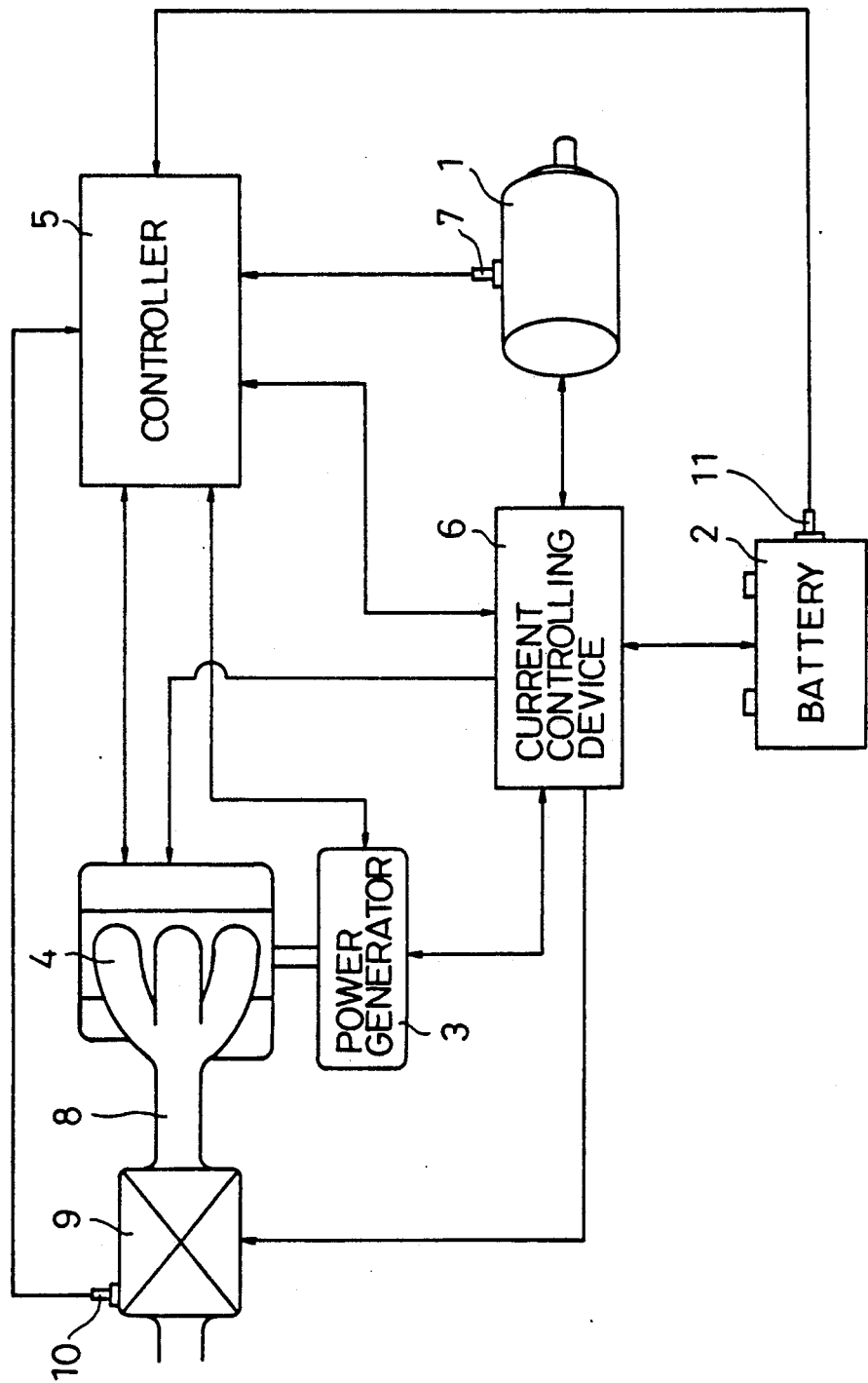
FIG. 1 is a block diagram showing a specific configuration of an exhaust gas purifying apparatus for a hybrid car in accordance with the present invention.

FIG. 1 shows the specific configuration of an exhaust gas purifying apparatus for a hybrid car in accordance with the present invention. The hybrid car comprises an electric motor 1 for driving the hybrid car, i.e., the vehicle, a battery 2 for supplying electric power to the electric motor 1, a power generator 3 for charging the battery 2, an internal-combustion engine 4 for driving the power generator 3, and a controller 5 which controls the operation of the internal-combustion engine 4 and which constitutes a control means.

The electric motor 1, which is made of a DC or AC motor, drives wheels, not shown, of a vehicle via a reduction gear or the like, to thereby drive the vehicle. A required number of the electric motors 1 are provided according to the construction of a vehicle. In FIG. 1, a typical one of the electric motors 1 is shown. The electric motor 1 receives electric power from the current controlling device 6. The electric motor 1 also functions as a power generator when the vehicle runs at its decelerated state, to thereby generate regenerative electric power. The regenerative electric power generated during the decelerated driving is sent to the current controlling device 6 to be used primarily for charging the battery 2.

Further, the electric motor 1 is equipped with a motor temperature sensor 7 for detecting the temperature of the electric motor 1, which sensor is connected to a controller 5 and supplies the detected temperature to the controller 5. The controller 5 monitors the overheating of the electric motor 1 in accordance with the output signals of the motor temperature sensor 7, i.e., motor temperature signals.

The battery 2 is connected to the above-mentioned current controlling device 6 to supply electric power mainly to the electric motor 1 via the current controlling device 6. When the battery 2 is being charged, the battery receives electric power from the electric motor 1 or the power generator 3 via the current controlling device 6.

Further, the battery 2 is provided with a battery capacity sensor 11. The battery capacity sensor 11 for detecting the capacity of the battery 2, e.g., the voltage value or the like of the battery 2, is connected to the controller 5 so as to supply a detected capacity of the battery 2, i.e., a battery capacity signal, to the controller 5. The controller 5 monitors the charged state of the battery 2 in accordance with the battery capacity signal.

The power generator 3 is driven by the internal-combustion engine 4 to generate electric power when necessary; it is connected to the current controlling device 6 to supply the generated electric power primarily to the battery 2, via the current controlling device 6. The power generator 3 also functions as the "starter" for driving the internal-combustion engine 4. At the start of the internal-combustion engine, the power generator receives electric power from the current controlling device 6 to actuate the internal-combustion engine 4.

Further, the power generator 3 is connected to the controller 5, and sends various types of information on the power generator such as the temperatures and failures of the power generator 3 to the controller, while it receives control signals for the power generator, including those control signals for controlling the power generating amount, stopping of power generation, etc., from the controller 5. The power generator 3 may be a device adapted to be exclusively used for power generation, by providing a separate starter for the internal-combustion engine 4. The power generator may be a DC or AC power generator.

The internal-combustion engine 4, which is a small piston engine, is operable to be started by the power generator 3 when necessary, and drive the power generator 3 to generate electric power after the steady operation of the engine is established. The engine 4 is controlled by the controller 5 as discussed later to perform driving at a constant rotational speed. The internal-combustion engine 4 receives several electric power lines from the current controlling device 6, e.g., the electric power necessary for igniting the internal-combustion engine 4, fuel injection, and driving diverse actuators, from the current controlling device 6.

The internal-combustion engine 4 is connected to the controller 5, and supplies various types of internal-combustion engine information, e.g., a rotational speed N and the amount of intake air, to the controller 5, while it receives various types of internal-combustion engine control signals, e.g., the control signals for controlling the start, stop, the rotational speed N, etc. of the internal-combustion engine 4, from the controller 5.

An exhaust pipe 8 is connected to an exhaust port, not shown, of the internal-combustion engine 4 to discharge exhaust gas from the internal-combustion engine 4. The exhaust pipe 8 is provided with an exhaust gas purifying heater catalyst 9 which comprises a catalyst and a heating means made into one piece. The catalyst removes harmful substances such as CO and NOx from the exhaust gas which passes through the exhaust pipe 8, and it provides an extremely powerful exhaust gas purifying effect when it is heated. The heater catalyst 9 has an electric heater; it is connected to the current controlling device 6 to receive electric power to heat the aforementioned catalyst thereby activating it.

Further, a catalyst temperature sensor 10 is attached to the heater catalyst 9, and the catalyst temperature sensor 10 detects a catalyst temperature T; it is connected to the controller 5 to supply the detected catalyst temperature T as a catalyst temperature signal to the controller 5.

As described above, the current controlling device 6 is connected to the electric motor 1, battery 2, power generator 3, internal-combustion engine 4, and the heater catalyst 9 to control the supply of electric power to or from them. The current controlling device 6 is connected to the controller 5, and supplies various types of current controlling device information such as failures of the current controlling device 6 to the controller 5. On the other hand, the current controlling device receives, from the controller 5, various types of current controlling device control signals, e.g., the control signals for controlling the values and directions of the electric currents which are supplied from the current controlling device 6 to the above-mentioned component units, whereby the aforementioned electric power supply control is performed.

As described above, the controller 5 receives the motor temperature signals from the motor temperature sensor 7, tile battery capacity signals from the battery capacity sensor 11, various types of power generator information from the power generator 3, various types of internal-combustion engine information from the internal-combustion engine 4, the catalyst temperature signals from the heater temperature sensor 10, and various types of current controlling device information from tile current controlling device 6. The controller 5 also receives various types of car body information such as tile vehicle traveling speed, i.e., the actual car speed $S_V$, the accelerator pedal depression amount $\theta_A$, etc. from diverse sensors which are not illustrated. Based primarily on these pieces of information, the controller 5 supplies various types of power generator control signals to the power generator 3, various types of internal-combustion engine control signals to the internal-combustion engine 4, and various types of current controlling device control signals to the current controlling device 6, as described above, to thereby control their operations.

With reference to FIG. 2 through FIG. 7, the operation of the exhaust gas purifying apparatus for the hybrid car will now be explained.

Figure 2:
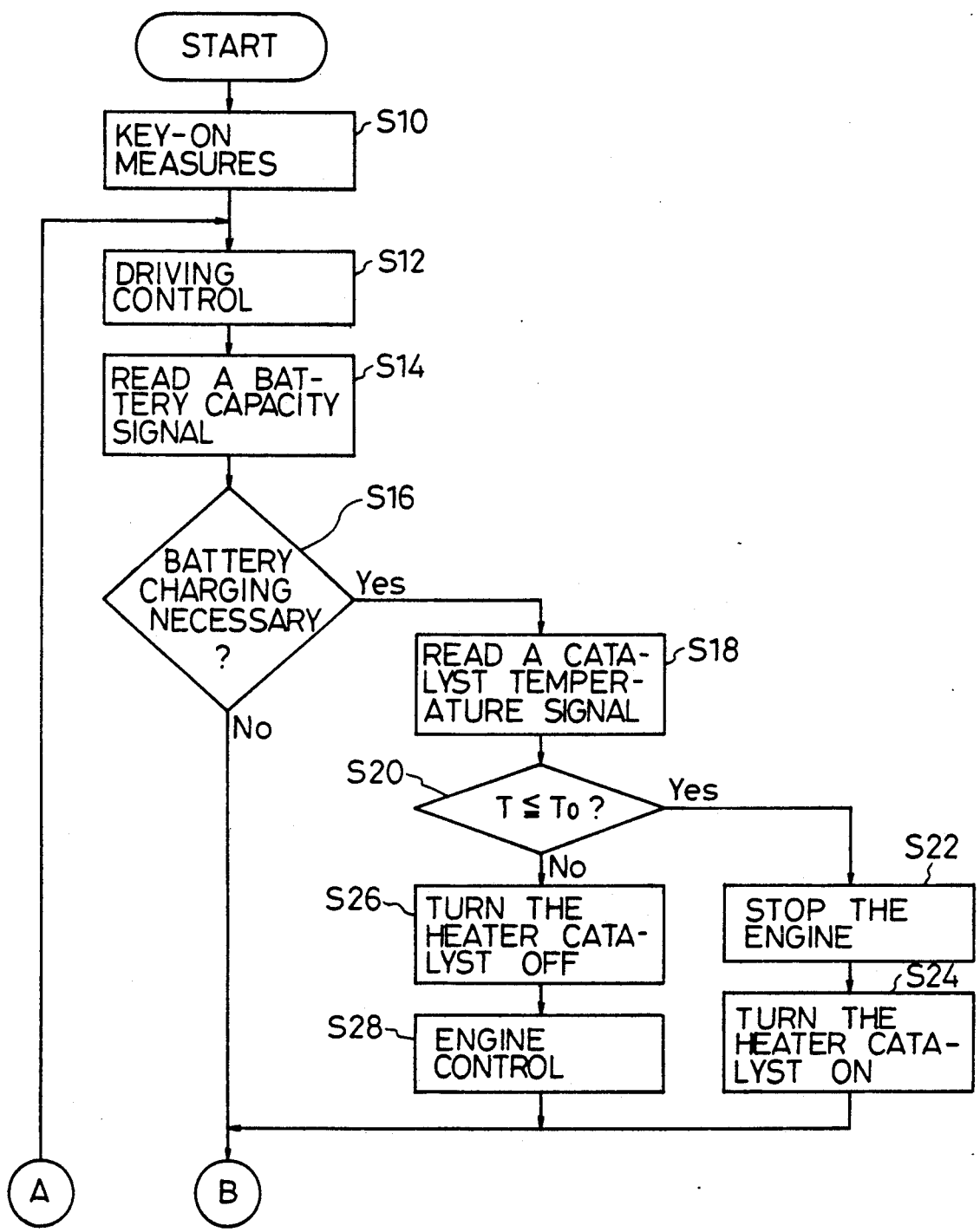
FIG. 2 is a flowchart showing a part of a procedure for exhaust gas purifying control conducted by a controller shown in FIG. 1.
Figure 3:
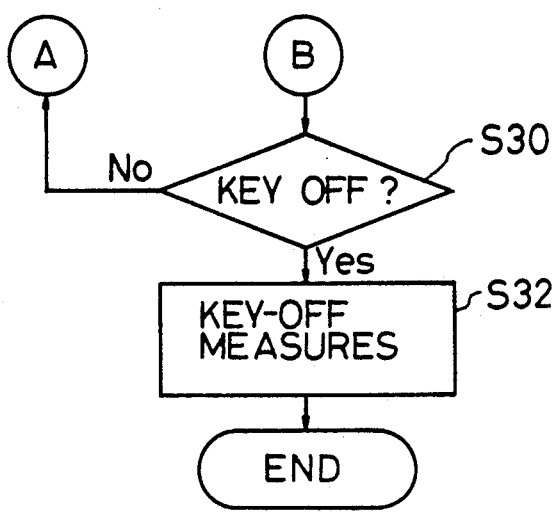
FIG. 3 is a flowchart showing the rest of the exhaust gas purifying control procedure.
Figure 4:
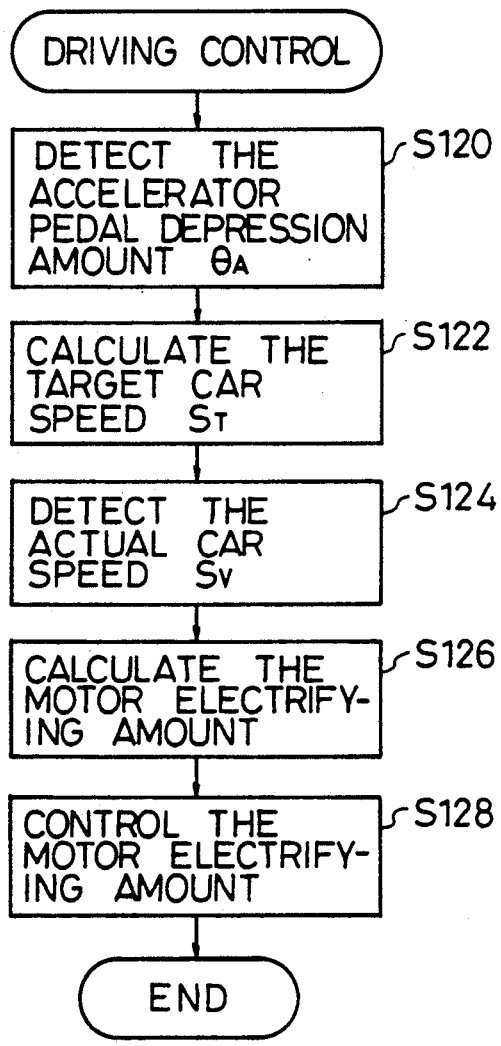
FIG. 4 is a flowchart showing a driving control procedure in the exhaust gas purifying control.

FIG. 2 and FIG. 3 show the flowchart of the exhaust gas purification control procedure conducted by the controller 5.

First, when a start key for actuating the vehicle is turned ON, the controller 5 carries out key-ON measures, including reading of a control backup memory, and checking of the conditions of parts (step S10).

Then, the controller 5 executes the driving control of a step S12. The driving control is performed in accordance with a driving control subroutine shown in FIG. 4.

In the driving control subroutine, the aforementioned accelerator pedal depression amount $\theta_A$ is detected (step S120).

Figure 5:
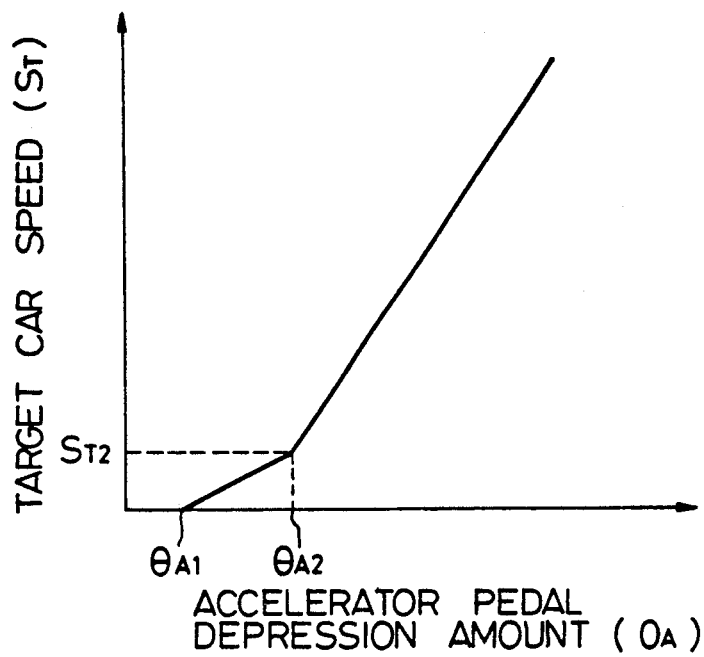
FIG. 5 is a characteristic chart showing the relationship between an accelerator pedal depression amount $\theta_A$ and a target car speed $S_T$, the chart being preset in the controller shown in FIG. 1.

Subsequently, based on the detected accelerator pedal depression $\theta_A$, the target car speed $S_T$ of the vehicle is calculated (step S122). The calculation of the target car speed $S_T$ is performed in accordance with the characteristic chart shown in FIG. 5 which is preset in the controller 5. FIG. 5 shows the relationship between the accelerator pedal depression amount $\theta_A$ and the target car speed $S_T$; the accelerator depression amount $\theta_A$ being given on the abscissa, while the target car speed $S_T$ on the ordinate. According to FIG. 5, when the accelerator pedal depression amount $\theta_A$ is small, i.e., up to $\theta_{A1}$, the target car speed $S_T$ is zero; in other words, the vehicle does not begin moving. Further, the target car speed $S_T$ is gradually increased to $S_{T2}$ at a constant rate until the accelerator pedal depression amount $\theta_A$ is increased from $\theta_{A1}$ to $\theta_{A2}$; in other words, the vehicle starts moving slowly. When the accelerator pedal depression amount $\theta_A$ is further increased to the extent that it exceeds $\theta_{A2}$, the target car speed $S_T$ is rapidly increased at a constant rate from $S_{T2}$; in other words, the vehicle enters the normal driving mode. In this way, the target car speed $S_T$ is set and calculated.

Next, the controller 5 detects the actual car speed $S_V$ (step S124).

According to the following formula (1), the car speed difference $\Delta S$ between the actual car speed $S_V$ detected in the step S124 and the target car speed $S_T$ computed in the step S122 is calculated.

$$\Delta S = S_V - S_T \tag{1}$$

Based on the car speed difference $\Delta S$, an electrifying amount I for the electric motor 1 is computed (step S126).

Figure 6:
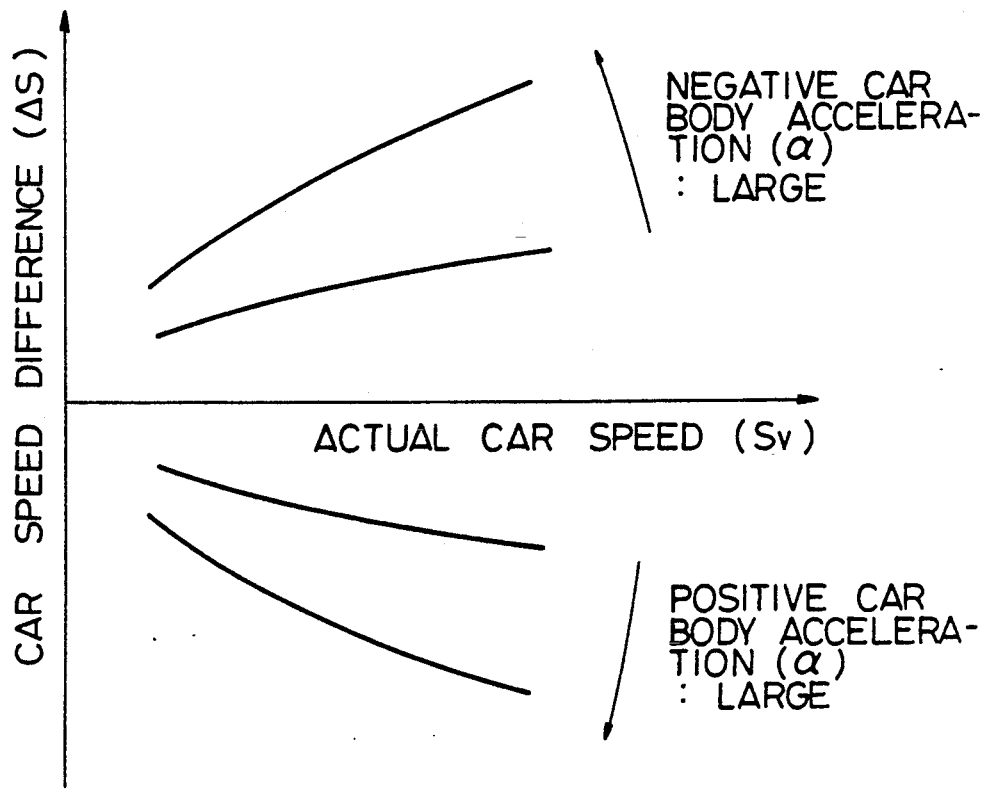
FIG. 6 is a characteristic chart showing the relationship between an actual car speed $S_V$, a difference $\Delta S$ in car speed, and a car body acceleration $\alpha$, the chart being preset in the controller.

The calculation of the electrifying amount I for the electric motor 1 is started by determining the required car body acceleration $\alpha$ in accordance with the characteristic chart given in FIG. 6 which is preset in the controller 5.

FIG. 6 shows the relationship between the actual car speed $S_V$, the car speed difference $\Delta S$, and the required car body acceleration $\alpha$, the actual car speed $S_V$ being given on the abscissa, the car speed difference $\Delta S$ on the ordinate, and the car body acceleration $\alpha$ being given as a variable. According to FIG. 6, for instance, when the actual car speed $S_V$ is constant, as the car speed difference a $\Delta S$ increases in a positive value, the required acceleration $\alpha$ increases in a negative value, while the required acceleration $\alpha$ increases in a positive value as the car speed difference $\alpha S$ increases in a negative value. In contrast, when, for example, the difference $\Delta S$ in car speed is constant in a positive value, the required acceleration $\alpha$ decreases in a negative value as the actual car speed $S_V$ increases; when, for example, the car speed difference $\Delta S$ is constant in a negative value, the required acceleration $\alpha$ decreases in a positive value as the actual car speed $S_V$ increases. In this way, the car body acceleration $\alpha$ is set.

Then, based on the car body acceleration $\alpha$ determined above, tile required output $P_S$ is calculated according to the following formula (2):ps $$P_S = [\{C \cdot A \cdot (S_V)^2 + \mu \cdot W + \alpha \cdot W/g\} \cdot S_V] / (K_1 \cdot \eta) \tag{2}$$

where C, A, $S_V$, $\mu$, W, $\alpha$, and $\eta$ are the air resistance coefficient, front projection area, the above-mentioned actual car speed, rolling resistance coefficient, total weight, car body acceleration, and power transmission efficiency of the vehicle, respectively, and "g" and $K_1$ denote the acceleration of gravity, and a first unit conversion constant.

Further, based on the output $P_S$ determined from the above formula (2), the value of the electric current necessary for operating the electric motor 1, i.e., the above-mentioned electrifying amount I for the motor, is finally calculated.

$$I=(K_2 \cdot P_2)/(\eta_{MTR} \cdot V) \qquad (3)$$

where $K_2$, $P_2$, $\eta_{MTR}$, and V are a second unit conversion constant, the output calculated from the above formula (2), the motor efficiency of the electric motor 1, and the working voltage of the electric motor 1, respectively.

After the motor electrifying amount I is calculated in the step S126 in this way, the controller 5 carries out the electrifying amount control for the electric motor 1 according to the motor electrifying amount I (step S128), thereby increasing or decreasing the vehicle speed to the target car speed $S_T$ or maintaining it at the target car speed $S_T$.

This completes the driving control subroutine.

Referring back to FIG. 2, the controller 5 then reads a battery capacity signal received from the aforementioned battery capacity sensor 11 (step S14).

The controller determines whether the battery 2 needs to be charged according to the read battery capacity signal read in the step S14 (step S16). This decision is made by determining whether the battery 2 still has enough charge to drive the vehicle on the battery 2 alone before the power generator 3 is driven by the internal-combustion engine following the completion of at least the heating of the heater catalyst, to thereby charge the battery 2 as will be discussed later.

If the judgment result of the step S16 is negative (NO), i.e., if it is unnecessary to charge the battery 2, then a step S30 to be discussed later will be executed.

If the judgment result of the step S16 is affirmative (YES), i.e., if it is necessary to charge the battery 2, then the controller reads a catalyst temperature signal received from the aforementioned catalyst temperature heater 10 (step S18).

Next, based on tile catalyst temperature signal read in the step S18, the controller judges whether or not the catalyst temperature T is lower than a predetermined temperature $T_0$ necessary for fully activating the catalyst (step S20).

If the Judgment result of the step S20 is affirmative, i.e., if the catalyst temperature T is lower than the predetermined temperature $T_0$, in which case exhaust gas purification cannot be fully conducted, the operation of the internal-combustion engine 4 is interrupted (step S22), and electric power is supplied to the heater catalyst 9 (step S24), whereby the catalyst is heated.

Subsequently, the step S30, which will be discussed later, is implemented.

If the judgment result of the step S20 is negative, i.e., if the catalyst temperature T exceeds the predetermined temperature $T_0$, in which case the catalyst has been activated for purifying exhaust gas to a satisfactory level, then the supply of the electric power to the heater catalyst 9 is stopped (step S26).

Next, the engine control is carried out in the step S28.

Figure 7:
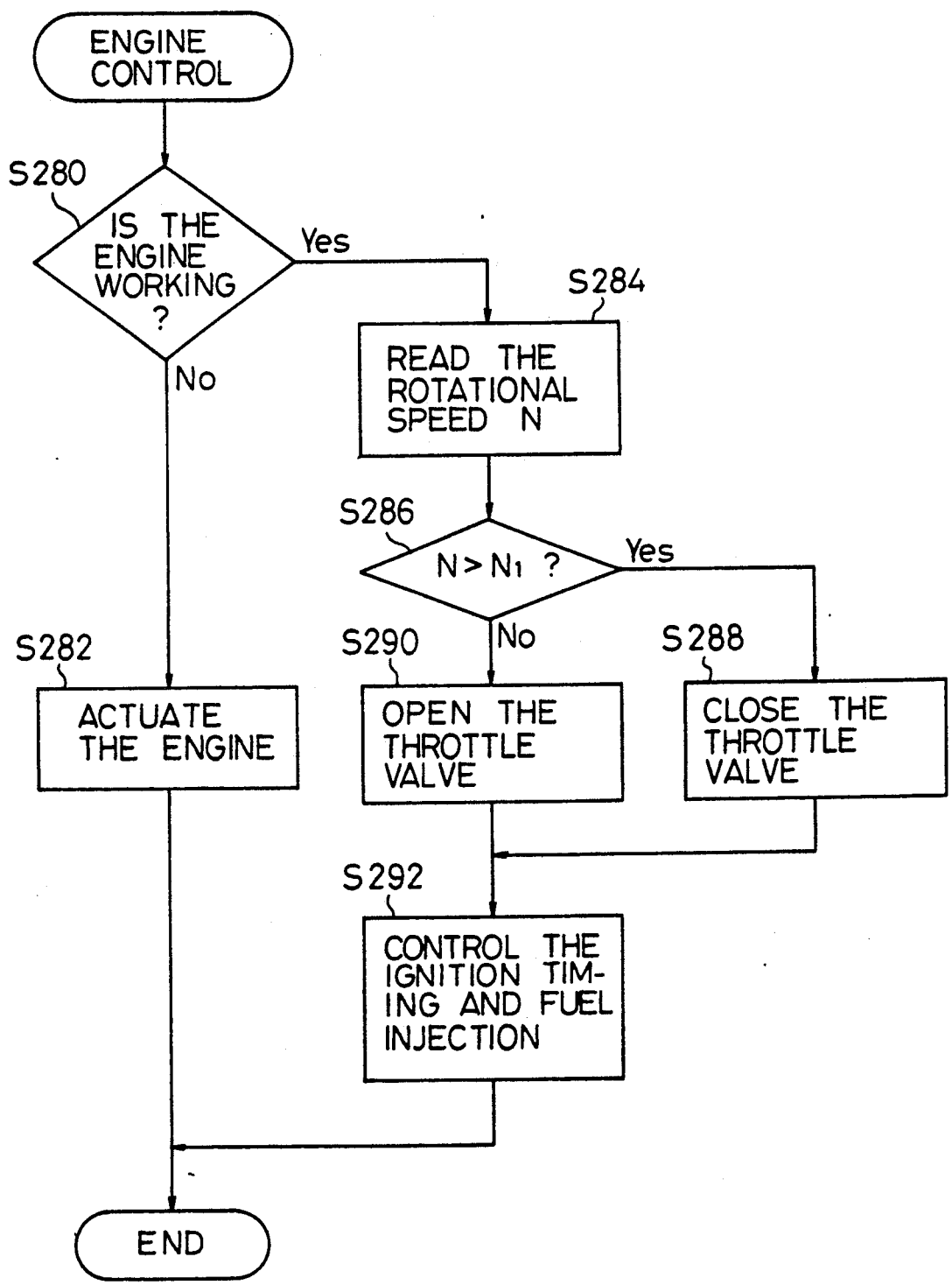
FIG. 7 is a flowchart showing an engine control procedure carried out by the controller in the exhaust gas purifying control.

The engine control of the step S28 is implemented in accordance with the engine control subroutine shown in FIG. 7.

In the engine control subroutine, the controller 5 first judges according to the associated signal in the controller 5 whether or not the internal-combustion engine 4 is working (step S280).

If the judgment result of the step S280 is negative, i.e., if the internal-combustion engine 4 is in the stopped state, then the internal-combustion engine 4 is started (step S282) so that charging of tile battery 2 is begun. Then the engine control subroutine is terminated.

If the judgment result of the step S280 is affirmative, i.e., if the internal-combustion engine 4 is already working, then the controller 5 reads the rotational speed N of the internal-combustion engine 4 (step S284). The controller determines whether the thus read rotational speed N of the engine 4 exceeds a predetermined rotational speed $N_1$ (step S286). The predetermined rotational speed $N_1$ of the internal-combustion engine 4 is the rotational speed at which the internal-combustion engine 4 runs in the steady driving mode.

If the judgment result of the step S286 is affirmative, i.e., if the rotational speed N of the internal-combustion engine 4 exceeds the predetermined rotational speed $N_1$, then the throttle valve, which controls the amount of intake air supplied into the engine 4, is driven in the closing direction (step S288) to decrease the amount of the intake air. This reduces the rotational speed N of the internal-combustion engine 4.

Further, if the judgment result of the step S286 is negative, i.e., if the rotational speed N of the internal-combustion engine 4 is smaller than the predetermined rotational speed $N_1$, then the throttle valve is driven in the opening direction (step S290) to increase the amount of the intake air into the engine 4. This increases the rotational speed N of the internal-combustion engine 4.

The constant-rotational speed control for the internal-combustion engine 4 is performed by the steps S284 through S290 described above.

The igniting timing and fuel injection are controlled in a step S292.

This terminates the engine control subroutine and also terminates the charging control for the battery 2 in the exhaust gas purifying control (steps S18 through S28).

Next, referring to FIG. 3, the controller 5 judges whether the start key of the vehicle is OFF in accordance with the associated signal in the controller 5 (step S30).

If the judgment result of the step S30 is negative, i.e., if the vehicle is traveling, the program goes back to the driving control in the step S12 described above to repeat the above-mentioned steps S12 through S30.

If the judgment result of the step S30 is affirmative. i.e., If the vehicle is stopped, then the key-OFF steps including backing up of the control memory and checking of the conditions of parts are carried out (step S32).

This terminates the exhaust gas purification control for the internal-combustion engine 4.

Thus, in the exhaust gas purifying apparatus for the hybrid car, the internal-combustion engine 4 is operated at tile constant rotational speed, enabling the power generator 3 to generate stable electric power and reducing harmful substances contained in tile exhaust gas of the internal-combustion engine 4.

Since the internal-combustion engine 4 is operated after the catalyst is heated and activated, harmful substances contained in exhaust gas are powerfully purified.

Additionally, the charging control (steps S18 through S28) for the battery 2 is implemented so that the battery 2 retains electric power, which is enough for driving the vehicle on the battery 2 alone, until at least heating of the heater catalyst is terminated, thus eliminating the possibility of the hybrid car encountering driving difficulties during a travel. In addition, at the next start of the vehicle, the vehicle can be immediately started and moved only on the charge of the battery 2 which has been charged as described above during the previous driving.

In the aforementioned heater catalyst 9, the catalyst is heated by an electric heater, but the heating source is not limited to that; it can be any other heating source. Further, the catalyst is combined with the heater into one piece in the above heater catalyst 9, but they may be separated into discrete units.

Further, the controller 5 may be designed so that it controls the exhaust gas purifying apparatus for the hybrid car and other operations of the vehicle at the same time.

Moreover, in the constant-rotational speed control of the internal-combustion engine 4 in the steps S284 through S290 implemented by the controller 5, the rotational speed N of the internal-combustion engine 4 is used to judge whether the internal-combustion engine 4 is being run at the constant rotational speed, but the judgment may alternatively be made by using other variable.

What is claimed is:

1. An exhaust gas purifying apparatus for a hybrid car, comprising:
    an electric motor for driving said hybrid car;
    a battery for supplying electric power to said electric motor;
    a power generator for charging said battery;
    an internal-combustion engine for driving said power generator;
    a catalyst provided in an exhaust pipe of said internal-combustion engine for purifying exhaust gas;
    heating means for heating said catalyst to enhance its catalytic action; and
    control means for controlling operation of said heating means and said internal-combustion engine and for actuating said engine after said catalyst is heated by said heating means to an activating temperature at which said catalyst is sufficiently activated.

2. The exhaust gas purifying apparatus of claim 1, said heating means including electric heating means which receives electric power from said battery.

3. The exhaust gas purifying apparatus of claim 2, said control means including battery charge amount judging means for determining whether said battery has a sufficient charge for driving said hybrid car on said battery alone until at least said battery is charged, said control means being operable to actuate said internal-combustion engine when said judging means determines that charging is necessary.

4. The exhaust gas purifying apparatus of claim 1, wherein said heating means is an electric heating means which receives electric power from said battery.

5. The exhaust gas purifying apparatus of claim 4, wherein said control means includes battery charge amount judging means for determining whether said battery has a sufficient charge for driving said hybrid car on said battery alone until at least said battery is charged.

6. The exhaust gas purifying apparatus of claim 5, said apparatus further comprising:
    catalyst temperature judging means for determining whether a temperature of said catalyst is lower than an activating temperature at which said catalyst is sufficiently activated, said control means further being operable to heat said catalyst to the activating temperature and actuate said internal-combustion engine, if said battery charge amount judging means determines that charging is necessary, and if said catalyst temperature judging means determines that the temperature of said catalyst is lower than the activating temperature.

7. An exhaust gas purifying method for a hybrid car equipped with an electric motor for driving the hybrid car, a battery for supplying electric power to said electric motor, a power generator for charging said battery, and an internal-combustion engine for driving said power generator, comprising the steps of:
    (a) heating a catalyst in an exhaust pipe of the internal-combustion engine for purifying gas, to thereby enhance its catalytic action; and
    (b) actuating the internal combustion engine after the catalyst has been heated, in said step (a), to a temperature at which the catalyst is sufficiently activated.

8. An exhaust gas purifying apparatus for a hybrid car, comprising:
    an electric motor for driving said hybrid car;
    a battery for supplying electric power to said electric motor;
    a power generator for charging said battery;
    an internal-combustion engine for driving said power generator;
    a catalyst provided in an exhaust pipe of said internal-combustion engine for purifying exhaust gas;
    heating means for heating said catalyst to enhance its catalytic action,
        wherein said heating means is an electric heating means which receives electric power from said battery;
    control means for controlling operation of said heating means and said internal-combustion engine, said control means including,
        battery charge amount judging means for determining whether said battery has a sufficient charge for driving said hybrid car on said battery alone until at least said battery is charged, said control means being operable to actuate said internal-combustion engine when said judging means determines that charging is necessary;
    catalyst temperature judging means for determining whether a temperature of said catalyst is lower than an activating temperature at which said catalyst is sufficiently activated, said control means further being operable to heat said catalyst to the activating temperature and actuate said internal-combustion engine, if said battery charge amount judging means determines that charging is necessary, and if said catalyst temperature judging means determines that the temperature of said catalyst is lower than the activating temperature.

9. The exhaust gas purifying apparatus of claim 8, wherein said control means is operable to actuate said internal-combustion engine after said catalyst is heated by said heating means to an activating temperature at which said catalyst is sufficiently activated.

10. The exhaust gas purifying method of claim 7, wherein said step (a) is performed using electric power from the battery.

11. The exhaust gas purifying method of claim 10, further comprising the steps of:
  (c) determining whether the battery has a sufficient charge for driving the hybrid car on the battery alone until at least the battery is charged; and
  (d) actuating the internal-combustion engine when charging is necessary.

12. The exhaust gas purifying method of claim 11, further comprising the steps of:
  (e) determining whether a temperature of the catalyst is lower than an activating temperature at which the catalyst is sufficiently activated;
  (f) heating the catalyst to the activating temperature; and
  (g) actuating the internal-combustion engine after the catalyst has been sufficiently activated, if charging is necessary, and if the temperature of the catalyst is lower than the activating temperature.

* * * * *